United States Patent

[11] 3,576,461

| [72] | Inventor | Salvatore A. Raciti<br>Pennington, N.J. |
|---|---|---|
| [21] | Appl. No. | 808,523 |
| [22] | Filed | Mar. 19, 1969 |
| [45] | Patented | Apr. 27, 1971 |
| [73] | Assignee | RCA Corporation |

[54] CONSTANT VELOCITY VECTOR GENERATOR
14 Claims, 4 Drawing Figs.

[52] U.S. Cl........................................................ 315/18,
315/22, 315/30
[51] Int. Cl................................................H01j 29/70,
H01j 29/52
[50] Field of Search.......................................... 315/18, 22, 30

[56] References Cited
UNITED STATES PATENTS
2,965,434 12/1960 Downs............................ 315/22X
3,431,458 3/1969 Christopher..................... 315/18
3,434,135 3/1969 Granberg et al................ 315/18X Primary Examiner—Richard A. Farley
Assistant Examiner—T. H. Tubbesing
Attorney—H. Christoffersen ABSTRACT: Each vector which is generated, regardless of its length, has orthogonal velocity components which are proportional to $\cos \theta$ and $\sin \theta$, respectively. Each vector therefore has a velocity proportional to $(\cos^2 \theta + \sin^2 \theta)^{1/2}$ and since this is equal to 1, each vector has a velocity which is constant. The present system is particularly useful in the printing industry where the line (of uniform width and brightness) described by the vector may be a part of a character drawn on the screen of a cathode ray tube employed to expose a photosensitive medium adjacent to the screen.

INVENTOR
SALVATORE A. RACITI

BY H. Christoffersen
ATTORNEY

CONSTANT VELOCITY VECTOR GENERATOR

BACKGROUND OF THE INVENTION

One method of "writing" a vector of uniform density and intensity on the screen of a cathode ray tube is to deflect the electron beam across the screen at a constant velocity. If the display produced is merely for viewing, this "constant" velocity need only be approximate, as the human eye can barely discern a 2 to 1 error in brightness. However, if the display is being employed to expose a photosensitive medium and if the movement of the electron beam across the screen is not at a truly constant velocity, the corresponding picture of the vector produced on the photosensitive medium will vary in width and intensity.

Prior art vector generators have used involved switching matrices and other techniques in an attempt to generate a constant velocity vector. In many instances, it was found that involved intensity control circuits were also needed, to assure that the vector generated was of uniform intensity.

It is an object of this invention, therefore, to provide a vector generator which is relatively simple and inexpensive, which generates a constant velocity vector without the need for complex intensity control circuits, and which is suitable for writing on a photosensitive medium.

BRIEF SUMMARY OF THE INVENTION

The system of the invention includes a display device having a screen and horizontal and vertical deflection means for moving an indicium in two directions across the screen. Sweep signals are supplied to the deflection means for imparting to the indicium orthogonal velocity components proportional to $\sin\theta$ and $\cos\theta$, respectively, regardless of the distance through which the indicium is to be moved. This causes such movement to occur at a constant velocity, since $(\sin^2\theta + \cos^2\theta)^{1/2} = 1$.

DETAILED DESCRIPTION

Figure 1:
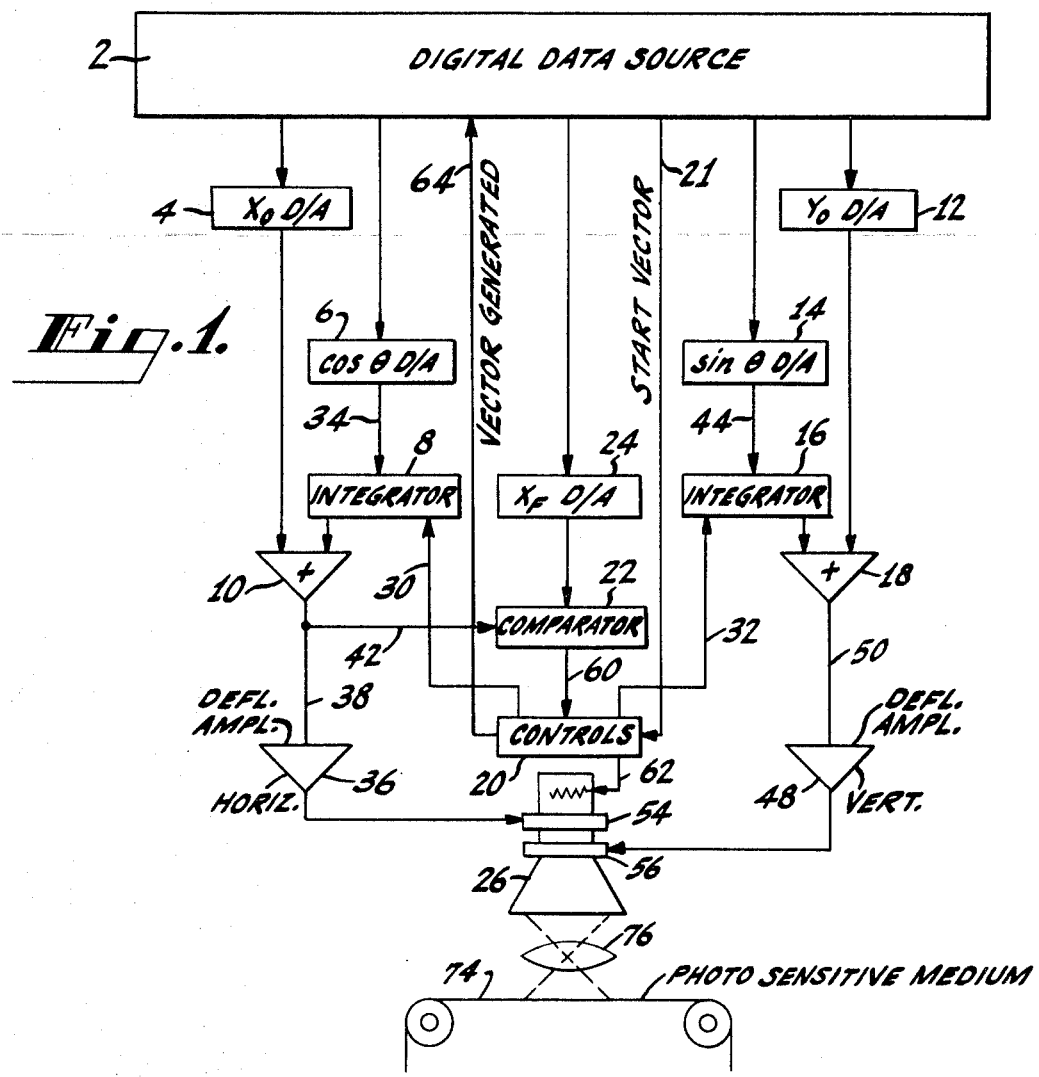
FIG. 1 is a block diagram of a preferred form of the present invention.

The vector generator shown in FIG. 1 is used to generate a vector at a constant velocity with each vector being generated in a time dependent on its length. The vector generator comprises a section for generating the horizontal component of the vector, a section for generating the vertical component of the vector, and a control unit which determines the time in which the vector is generated and the amount of time the display device is turned on.

The digital data source 2 may be a digital computer and it supplies the binary data which describes the vector to be generated and it also supplies the signals for controlling the vector generation process.

The horizontal section of the vector generator comprises a digital-to-analog (D/A) converter 4 which receives from the source 2 a binary signal indicative of the initial value of the horizontal component of the vector, $X_o$, and another D/A converter 6 which receives from the same source a binary signal indicative of the cosine of the vector angle, $\cos\theta$. An integrator means 8 is connected to D/A converter 6, and a summing means 10 receives the outputs of the integrator 8 and converter 4.

The vertical section of the vector generator comprises a D/A converter 12, which receives from source 2 a binary signal indicative of the initial value of the vertical component of the vector, $Y_o$ and a second D/A converter 14 which receives from the same source a binary signal indicative of the sine of the vector angle, $\sin\theta$. An integrator means 16 is connected to the D/A converter 14, and a summing means 18 receives the outputs of the integrator 16 and converter 12.

The control section of the vector generator comprises a control unit 20 which receives a signal from the source 2 to start the vector generation process, a comparator means 22 and a D/A converter 24 which receives a binary signal indicative of the final value of the horizontal component of the vector, $X_f$.

After the respective D/A converters receive data from the digital data source 2, the control unit 20 receives from the same source a start signal via line 21. In response to the start signal, the control unit 20 removes the bias from the display device 26, which may be a cathode ray tube (CRT), thereby turning on the cathode ray beam, permitting it to start drawing an image (vector) on its screen.

Figure 2:
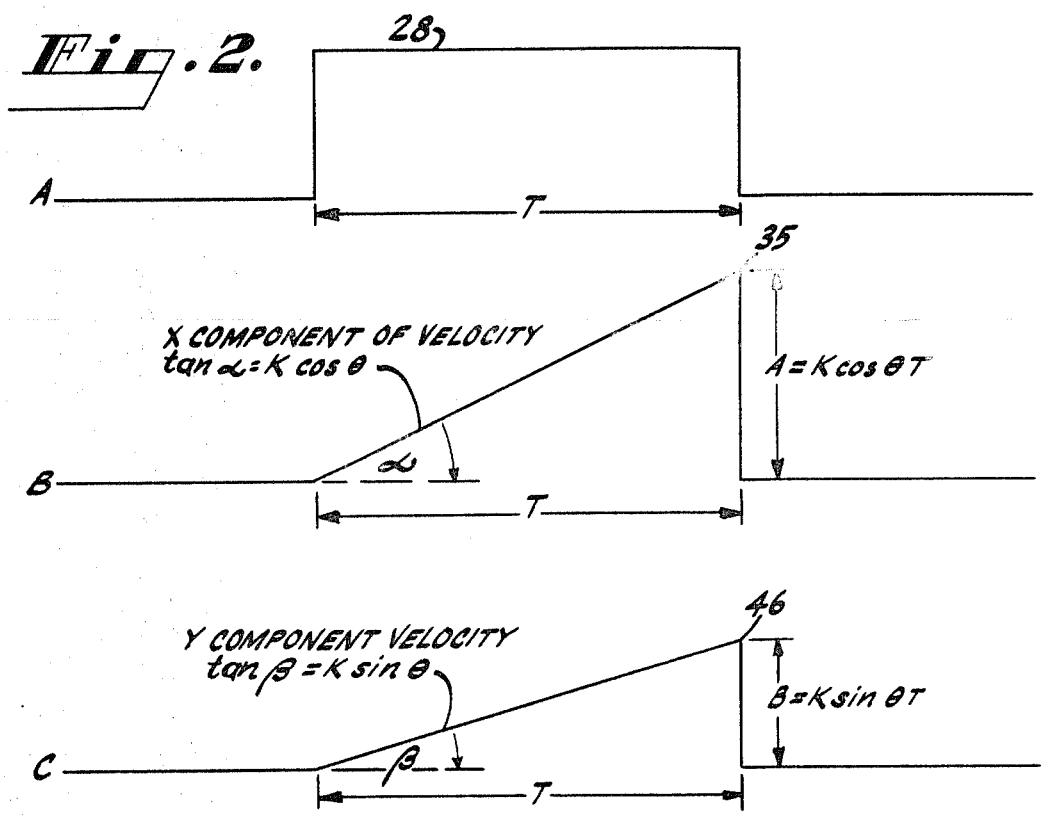
FIG. 2 illustrates a number of the waveforms produced in the system of FIG. 1.

At the same time the bias is removed from the CRT 26, the control unit 20 sends a gating signal 28, such as illustrated at A in FIG. 2, to the integrators 8 and 16 via lines 30 and 32, respectively. The gating signal 28 energizes gate means, not shown, which may be conventional logic gates within the respective blocks 8 and 16, which then permits the integrators to begin integrating.

In the horizontal section of the vector generator, D/A converter 6 supplies to integrator 8, via line 34, a direct current level indicative of the $\cos\theta$. This direct current level determines the polarity, plus or minus, and the slope of the ramp voltage produced by the integrator 8.

The output of the integrator 8 is given by $$\int_0^T K\cos\theta\,dt = K\cos\theta\,T.$$

$K\cos\theta\,T$, therefore, is the amplitude 35 of the ramp voltage produced by the integrator 8 at time T, and is illustrated at B in FIG. 2. K is an operational constant of the integrator 8, and it is to be understood that the linear portion of the integrator output is used for sweep generation.

The slope of the ramp voltage is the derivative of the equation above, with respect to time, and is, therefore, the velocity of the X component of the vector and is given by:

$dx/dt = K\cos\theta = $ X component of velocity.

The ramp voltage from integrator 8 is applied to summing means 10. The second input to the summing means 10 is direct current level indicative of the initial value of the horizontal component of the vector, $X_o$, which is produced by D/A converter 4. The output of summing means 10, therefore, is a ramp voltage linearly increasing an amplitude at a velocity $K\cos\theta$, starting from a base line which is the direct current level indicative of $X_o$. This voltage is applied to horizontal deflection amplifier 36 via line 38 and is used to deflect the cathode-ray beam linearly in the horizontal direction, starting at $X_0$, and at a velocity $K\cos\theta$. This is shown vectorially at 40 in FIG. 3. The output of summing means 10 is also applied to comparator 22, via line 42, for a reason to be explained later.

In the vertical section of the vector generator, D/A converter 14 supplies to integrator 16, via line 44, a direct current level indicative of the sine $\theta$. This direct current level determines the polarity, plus or minus, and the slope of the ramp voltage produced by the integrator 16.

The output of the integrator 16 is given by $$\int_0^T K\sin\theta\,dt = K\sin\theta\,T.$$

$K\sin\theta\,T$, therefore, is the amplitude 46 of the ramp voltage produced by integrator 16 at time T, and is illustrated at C in FIG. 2. As in the horizontal section of the system, K is an operation constant of the integrator 16, and only the linear portion of the integrator output is used for sweep generation.

The slope of the ramp voltage is the derivative of the equation above, with respect to time, and is, therefore, the velocity of the vertical component of the vector and is given by $dy/dt = K\sin\theta = $ Y component of velocity.

The ramp voltage from integrator 16 is applied to summing means 18, and the second input to summing means 18, and the second input to the summing means 18 is a direct current level indicative of the initial value of the vertical component of the vector, $Y_o$, produced by D/A converter 12. The output from summing means 18, therefore, is a ramp voltage linearly increasing in amplitude at a velocity $K \sin \theta$ impressed upon the direct current level indicative of $Y_o$. This voltage is applied to vertical deflection amplifier 48 via line 50 and is used to linearly deflect the cathode-ray beam in the vertical direction, starting at $Y_o$, and at a velocity $K \sin \theta$. This is shown vectorially at 52 in FIG. 3.

Figure 3:
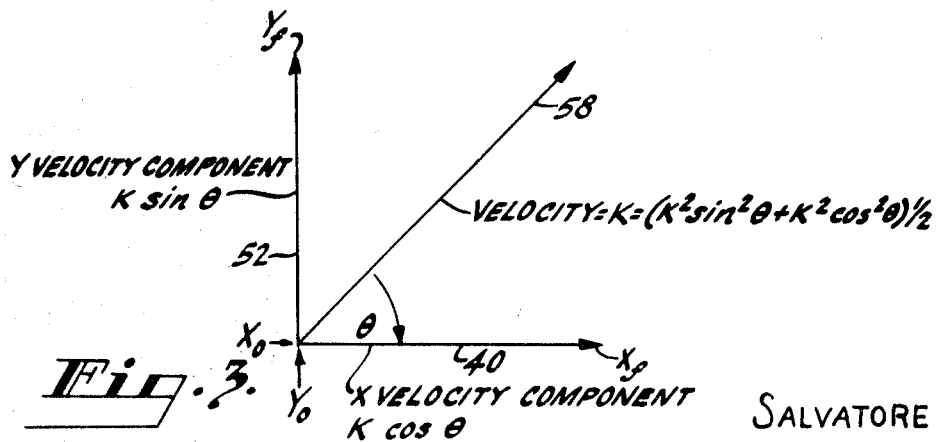
FIG. 3 is a vector diagram to help explain the operation of the system of the invention.

The outputs of the respective deflection amplifiers are applied as linear deflection voltages to horizontal deflection means 54 and vertical deflection means 56 to produce the resultant velocity vector 58 shown in FIG. 3. As was shown before, the horizontal and vertical velocity components of the vector are $K \cos \theta$ and $K \sin \theta$, respectively, so the resultant velocity vector is described by the equation $$\sqrt{K^2 \cos^2 \theta + K^2 \sin^2 \theta}$$

and, as $\cos^2 \theta + \sin^2 \theta = 1$, the vector is always deflected at a constant velocity $K$ for all values of $\theta$.

Since all vectors are generated at the same velocity $K$, vectors of different lengths, therefore, must be generated in different time intervals. The means for accomplishing this is the comparator means 22. Its two inputs are the output of the summing means 10 and a direct current level indicative of the final value of the horizontal component of the vector, $X_f$, from D/A converter 24.

When the output of summing means 10, which initially is at a direct current level indicative of the initial value of the horizontal component of the vector, $X_0$, reaches a value equal to the direct current level produced by D/A converter 24, which is indicative of the final value of the horizontal component of the vector, $X_f$, the comparator means 22 produces an output signal on line 60. The control unit 20, in response to this signal, causes the gating signal 28, shown at A in FIG. 2, to go low, returning the integrators 8 and 16 to their initial state, as shown in FIG. 2, and also applies a blanking level to the CRT via line 62. The control unit 20 also sends a signal via line 64 to the digital data source 2 to inform it that the system is ready to generate a new vector.

Other means for accomplishing the comparison process can also be employed. For example, the D/A converter 24 could have a binary signal indicative of the final value of the vertical component of the vector, $Y_o$, as an input, rather than $X_o$, and the other input to the comparator 22 would be from summing means 18 rather than summing means 10.

Figure 4:
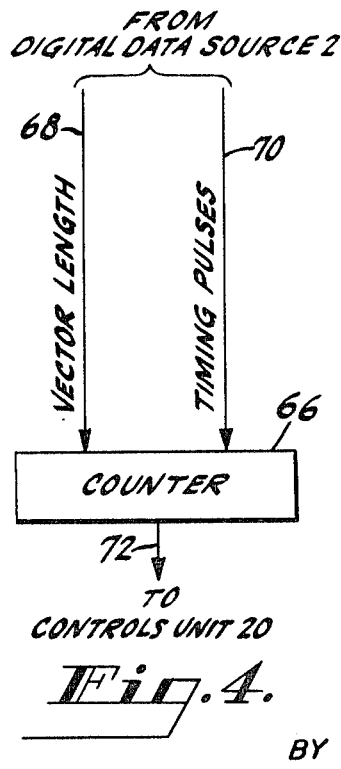
FIG. 4 is a block diagram of a portion of another embodiment of the invention.

Another means for accomplishing the result of having each vector generated in a time dependent on its length is to remove D/A converter 24 and comparator 22 and to substitute a vector length counter 66, as illustrated in FIG. 4. The counter receives from the source 2, via line 68, as a first input, a binary signal indicative of the length desired for the vector, and as a second input via line 70, a train of timing pulses having a period proportional to $K$. The latter causes the counter to count "down" from the count indicative of the resultant length of the vector to zero. When the counter reaches the count of zero, a zero count detector within the counter sends a signal via line 72 to the control unit 20 and the control unit then turns off the integrators, blanks the CRT and signals the source that the system is ready to generate a new vector, as was explained before.

The system of FIG. 1 also includes a photosensitive medium 74, as shown in FIG. 1, and an optical system shown schematically as a single lens 76 between the screen of the CRT and the medium 74. The purpose of the lens system is to project the characters, numbers or the like traced by the vectors onto the photosensitive medium 74, which later may be developed to provide the basis, for example, for a printing master for a page of print. The characters or other graphic material formed in this way have the important advantage of being of uniform width and density.

I claim:

1. In a system for generating vectors, in combination:

display means having a screen and horizontal and vertical deflection means for deflecting an indicium across said screen; and means for applying to the respective deflection means deflection signals for deflecting said indicium at velocities proportional to $\cos \theta$ and $\sin \theta$, said means comprising two integrators and means for supplying to said integrators direct current levels indicative of the slopes of said deflection signals.

2. The combination claimed in claim 1, including means for generating each vector in a time dependent on its length.

3. The combination claimed in claim 2:

said last-named means comprising a comparator having two inputs;

a first means for supplying to the first input of said comparator a direct current level indicative of the final length of one of the horizontal and vertical component of a vector;

a second means for supplying to the second input of said comparator a direct current level indicative of the initial value of one of the horizontal and vertical component of the vector and increasing in amplitude at a rate proportional to one of the $\cos \theta$ and $\sin \theta$; and control means for terminating the deflection of said indicium when the current levels from said first and second means are of equal values.

4. The combination claimed in claim 3:

said second means comprising a summing device having two inputs;

means for supplying to one input of said summing means a direct current level indicative of the initial value of one of the horizontal and vertical component of a vector; and means for supplying to the other input of said summing means the output from one of said two integrators.

5. The combination claimed in claim 4, including means for applying the output of said summing means to the horizontal and vertical deflection means of said display means to deflect said indicium at a constant velocity.

6. The combination claimed in claim 3:

said last-named means comprising a counter;

means for supplying a binary signal to said counter indicative of the length of a vector;

means for supplying timing pulses to said counter such that said counter can count down to zero from the count indicative of the length of the vector; and control means for terminating the deflection of said indicium when the count in said counter reaches zero.

7. The combination claimed in claim 1, including:

a photosensitive medium adjacent to said display means; and means for exposing said photosensitive medium as said indicium is deflected across the screen of said display means.

8. In a system for generating vectors, the combination comprising:

display means having a screen and horizontal and vertical deflection means for deflecting an indicium across said screen;

first and second integrators; and means for applying signals which have slopes proportional to the $\cos \theta$ and $\sin \theta$ to said first and second integrators respectively, said deflection means being responsive to the output signals from said first and second integrators for deflecting said indicium across said screen at a constant velocity.

9. In combination:

a cathode-ray tube having means producing an electron beam, a screen on which said beam is focused for producing a luminous spot, first deflection means for deflecting said beam along one coordinate of said screen, and second deflection means for deflecting said beam along a second coordinate of said screen perpendicular to said first coordinate;

a first integrator;

means for applying to said first deflection means a direct voltage level indicative of the starting position on the screen along said one coordinate, of a sweep, and a sweep voltage having a rate proportional to cos $\theta$, said sweep voltage being generated by said first integrator and means for applying to said first integrator a direct current level indicative of the slope of the first deflection signal;

a second integrator; and means for applying to said second deflection means a direct voltage level indicative of the starting position on said screen along said second coordinate, of a sweep, and a sweep voltage having a rate proportional to sin $\theta$, where $\theta$ is the angle of deflection, said sweep voltage being generated by said second integrator and means for applying to said second integrator a direct current level indicative of the slope of the second deflection signal.

10. The combination claimed in claim 9, including:

a photosensitive medium adjacent to said display means; and means for exposing said photosensitive medium as said indicium is deflected across the screen of said display means.

11. In a system for generating vectors, the combination comprising:

display means having a screen and horizontal and vertical deflection means for deflecting an indicium across said screen;

means for deflecting said indicium in a time dependent on the length of the vector to be generated;

a first summing means;

means for applying a direct current level indicative of the initial value of the horizontal component of the vector to an input of said first summing means;

a first integrating means;

means for applying a direct current level indicative of the slope of the horizontal component of the deflection signal to said first integrating means;

means for applying the output of said first integrating means to another input of said first summing means;

means for applying the output of said first summing means to the horizontal deflection means of said display means to deflect the indicium at a velocity proportional to the cos $\theta$;

a second summing means;

means for applying a direct current level indicative of the initial value of the vertical component of the vector to an input of said second summing means;

a second integrating means;

means for applying a direct current level indicative of the slope of the vertical component of the deflection signal to said second integrating means;

means for applying the output of said second integrating means to another input of said second summing means; and means for applying the output of said second summing means to the vertical deflection means of said display means to deflect the indicium at a velocity proportional to the sin $\theta$.

12. The combination claimed in claim 11:

said first-named means comprising a comparator device having two inputs;

means for supplying a direct current level indicative of the final value of one of the horizontal and vertical component of the vector to one input of said comparator device;

means for supplying to another input of said comparator device a direct current level indicative of the initial value of one of the horizontal and vertical component of the vector and increasing in amplitude at a rate proportional to one of the cos $\theta$ and sin $\theta$; and control means for terminating the deflection of said indicium when the two current levels are equal.

13. The combination claimed in claim 11:

said first-named means comprising a counter having two inputs;

means for supplying a binary signal indicative of the length of a vector to said counter;

means for supplying timing pulses to said counter such that said counter can count down to zero from the count indicative of the length of the vector; and control means for terminating the deflection of said indicium when the count in the counter reaches zero.

14. In a digitally controlled system for generating vectors, the combination comprising:

a display device having a screen and horizontal and vertical deflection means for generating a vector on said screen;

a digital data source;

digital-to-analog conversion means;

means for applying from said digital data source binary data indicative of the initial value of the horizontal and vertical components of a vector to said conversion means;

means for applying from said digital data source binary data indicative of the sin $\theta$ and cos $\theta$ to said conversion means;

first and second integrators responsive to the sin $\theta$ and cos $\theta$ outputs, respectively, of said conversion means for producing respective waves having velocities proportional to sin $\theta$ and cos $\theta$; and means for applying the initial value outputs of said conversion means and the respective waves from said first and second integrators to the respective deflection means for generating a vector at velocities proportional to sin $\theta$ and cos $\theta$.